United States Patent [19]

Hergenrother et al.

[11] Patent Number: 4,983,691

[45] Date of Patent: Jan. 8, 1991

[54] REDUCTION OF ACIDITY OF POLYESTERS BY MELT REACTION ENDCAPPING WITH DIALKYLOXYLATE OR TETRAALKYL UREA

[75] Inventors: William L. Hergenrother, Akron; John M. Doshak, Mogadore, both of Ohio

[73] Assignee: Bridgestone/Firestone, Inc., Akron, Ohio

[21] Appl. No.: 397,221

[22] Filed: Aug. 23, 1989

[51] Int. Cl.$^5$ .............................................. C08F 20/00
[52] U.S. Cl. .................................... 525/437; 525/439; 525/444; 525/540
[58] Field of Search ................ 525/437, 439, 444, 540

[56] References Cited

U.S. PATENT DOCUMENTS 3,839,272 10/1974 Yankowsky ........................ 524/417
3,968,159 7/1976 Iqbal ................................... 564/275
4,200,731 4/1980 Massey et al. ...................... 525/437
4,774,315 9/1988 Miller ................................. 528/179
4,886,875 12/1989 Gay et al. ........................... 525/439

OTHER PUBLICATIONS

CA82(4):18563p "Hydrolytic and Melt Degradation Stabilized Polyester".
CA109(24):212124n "Manufacture of Hydrolysis-Resistant Polyester Resin Composition".
CA112(16):140505z "Manufacture of End-Capped Polyester With Low Moisture Absorption".

Primary Examiner—John Kight, III
Assistant Examiner—Sam A. Acquaht
Attorney, Agent, or Firm—Frank J. Troy, Sr.

[57] ABSTRACT

A method for the melt reaction of polyesters, particularly polyethylene terephthalate, with an endcapping agent which reacts with terminal carboxyl groups of the polyester. The endcapping agents are selected from the group consisting of dialkyloxylates and tetraalkylureas.

8 Claims, No Drawings

REDUCTION OF ACIDITY OF POLYESTERS BY MELT REACTION ENDCAPPING WITH DIALKYLOXYLATE OR TETRAALKYL UREA

BACKGROUND OF THE INVENTION

Polyesters utilized in fiber formation are generally produced by a heated reaction of one or more dibasic acids such as terephthalic acid, or the like, with one or more polyhydroxy compounds such as ethylene glycol, propylene glycol, 1,4-cyclohexane dimethanol, or the like, until a product of desired viscosity is obtained. The formed polyesters are characterized in that they contain both terminal hydroxy and carboxy groups. Terminal hydroxy groups are generally more predominant due to the incorporation of an excess of polyol in the reactive mixture.

Polyesters are of great importance in the manufacture of tire cords, and as reinforcement for belts, hoses and many other useful articles. In many of these commercial applications the presence of excessive carboxyl groups in the polymer molecule is detrimental.

Previous attempts at acid group reduction in polyesters have resulted in a loss of average molecular weight in the polyester product due to substantial cleavage in the polyester backbone.

It is an objective of the instant invention to provide improved polyester materials in which the pendant carboxyl groups are either greatly reduced in number or are completely removed.

It is a further object of the invention to endcap free carboxyl groups on polyesters without producing water as a byproduct and while maintaining the molecular weight of the polyesters.

It is a further object of the instant invention to provide polyester materials having reduced sensitivity to water.

SUMMARY OF THE INVENTION

The instant invention relates to melt reaction of a carboxyl group containing polyester with a carboxyl group reactive endcapping agent selected from the group consisting of dialkyloxylates and tetraalkylureas, in which the alkyl groups are lower alkyl radicals; to provide a polyester having a substantially reduced number or no carboxyl group while maintaining the approximate molecular weight of the carboxyl group containing polyester precursor.

DETAILED DESCRIPTION OF THE INVENTION

In the practice of the present invention the polyester material is first produced in any state of the art commercial manner. A typical process for production of a polyester is the heated reaction of a basic difunctional organic acid with a polyol, preferably a diol, optionally together with any other desired components.

Suitable polyesters for treatment in the instant invention are prepared from difunctional organic acids including, but not limited to: terephthalic acid, 4,4'-dicarboxydiphenyl, 1,5-,1,4-, or 2, 6-naphthalic acid and the like. Suitable polyols are preferably diols such as, but not limited to, ethylene glycol, propylene glycol, butylene glycol, and the like. The preferred polyesters of the instant invention are homopolyesters such as polyethylene terephthalate, poly-1,4-cyclohexylenedimethylene terephthalate, polyethylene-2, 6-naphthalate, polyester ethers such as polyethylene hydroxybenzoate, poly-p-phenylene bis-hydroxyethoxy-benzoate, poly-p-phenylene bis-hydroxyethoxy-terephthalate; copolyesters or copolyester ethers which comprise mainly ethylene terephthalate units or tetramethylene terephthalate units and other copolymer components such as tetramethylene or ethylene isophthalate, 1,4-cyclohexylenedimethylene terephthalate units, or tetramethylene or ethylene p-hydroxybenzoate units, or the like. The preferred polyester for treatment in the instant invention is polyethylene terephthalate. Polyesters for treatment in the instant invention have an acid value ranging from 40 to 10 equivalents of $CO_2H$ per $10^6$gm of polyester. Polyesters for treatment in the instant invention should have an average molecular weight ranging from 10,000 to about 60,000.

In the practice of the instant invention a formed polyester is melt reacted with a carboxy reactive group or endcapping agent selected from the following groups: dialkyloxylates and cyclic tetraalkylureas in which the alkyl groups are lower alkyl radicals. The use of any of these endcapping agents permits the treated polyesters to retain their approximate molecular weight and viscosity as significant amounts of water which would promote polymer degradation are not generated during endcapping reaction.

The dialkyloxylates which can be utilized in the instant invention are represented by the following structural formula: $R_1OOCCOOR_2$ (I) wherein $R_1$ and $R_2$ represent the same or different $C_1$–$C_5$ alkyl radicals. The preferred dialkyloxylates are dimethyloxylate and diethyloxylate.

The dialkyloxylates of the present invention are utilized to endcap carboxy terminated polyesters by the following reaction: $R_1\text{—OOCCOOR}_2 + Polyester\text{—COOH} \rightarrow Polyester\text{—COO}(R_1 \text{ or } R_2) + HOOCCOO(R_1 \text{ or } R_2)$ wherein $R_1$ and $R_2$ are as defined above. The alkyl group which esterifies the carboxylpolyester is, of course, replaced in the dialkyloxylate by a hydrogen atom to yield an alkyloxalic acid monoester.

The tetraalkyl urea compounds which are utilized as endcapping agents are represented by formula (II):

wherein $R_{6-9}$ are the same or different $C_1$–$C_5$ alkyl radicals or $R_8$ and $R_9$ taken together form a heterocyclic radical with a nitrogen atom. The preferred tetraalkyl urea compound is bis(pentamethylene) urea or other symmetric ureas.

The tetraalkyl urea endcapping agents of the instant invention endcap carboxy terminated polyesters by the following reaction:

$R_6R_7NCONR_8R_9$ + Polyester-COOH ⟶

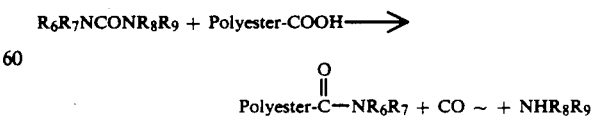

wherein $R_{6-9}$ are as previously defined.

In the process of the present invention the melt extrusion reaction of the polyester and the appropriate endcapping agent should occur in a temperature range between 270° C. and 320° C. The endcapping agent feed rate into the melt extruder should range between 1 and 50 millimoles per minute per 100 grams per minute of polyester feed. The reaction residence time of the polyester and the endcapping agent in the melt reaction must be at least 10 seconds to provide for substantial endcapping of the carboxyl groups present on the untreated polyester which is fed into the melt reactor. This residence time allows for endcapping of the acid group thereby effecting acid number reduction of the polyester to an acid number below 10 equivalents of $CO_2H$ per $10^6$gm of polyester, preferably below 3 eq. $CO_2H/10^6$gm of polyester.

The polyesters produced in accordance with the instant procedure having less than 10 equivalents of $CO_2H$ per $10^6$ grams of polymer are accorded the status of having substantially all of their carboxyl groups endcapped.

The following examples are presented for the purposes of clarifying the present invention. However, it should be understood that they are not intended to limit the present invention in any way.

The following are specific examples for each of the above groups of the endcapping agents and their use in capping the free carboxyl groups in polyesters. In all of the following examples the treated polyester is polyethylene terephthalate.

In each of the following examples the polyethyleneterephthalate (PET) melt was prepared as follows. Tirecord grade PET was continuously prepared from terephthalic acid and ethylene glycol to give an intrinsic viscosity, $[\eta]$, of 0.94 dl/gm at 25° C. in 1:1 ratio of phenol:tetrachloroethane. The PET in chip form was dried at 110° C. for at least twelve hours in a rotary dryer under a vacuum of 0.10 mm of Hg. The recovered dry PET polymer was transferred to an Acrison No. 1015Z-C feeder under a nitrogen atmosphere and fed to a Werner-Pfleiider ZSK-30 twin screw compounding extruder which had all zones heated to either 280° C. or 300° C. At a polymer feed rate of 40 gm/min or 100 gm/min the PET polymer had a melt residence time of 85 or 35 seconds, respectively, in the extruder.

EXAMPLE 1

The compounding extruder zones were heated to 280° C. and the feed rate of the PET polymer was 87 gm/min. During the PET melt residence time of about 40 seconds the last part of zone one of the compounding extruder was continuously injected with 10.4 millimoles (mM)/min (1.07 cc/min) of the capping agents dimethyloxalate using a BIF microfeeder No. 1180-07 piston pump. The extruded polymer was cooled, chopped and analyzed to display an intrinsic viscosity $[\eta]=0.73$ dl/gm and 1.8 eq $CO_2H/10^6$ gm of PET polymer.

In comparison, a control PET polymer passing through the compounding extruder without the added dimethyloxalate displayed $[\eta]=0.72$ dl/gm and 23.8 eq.$CO_2H/10^6$ gm of polymer.

EXAMPLE 2

In accordance with the procedure of Example 1, PET polymer was fed into a compounding extruder heated to 280° at a feed rate of 23 gm/min having an extruder residence time of about 2.5 minutes. During the melt time, bis(pentamethylene) urea was injected into the extruder at a feed rate of 2.00 cc/min (10.4 millimoles/min). The extruded polymer was cooled, chopped and analyzed to show an $[\eta]=0.54$ dl/gm and 4.2 eq $CO_2H/10^6$gm of polymer. A noncapped extruded PET polymer displayed an $[\eta]=0.80$ dl/gm and 41.2 eq $CO_2H/10^6$gm of polymer.

We claim:

1. A method for reducing the acidity of polyesters which comprises melt reacting a carboxyl group containing polyester having an acid value ranging from 40 to 10 equivalents of $CO_2H$ per $10^6$ gm of polyester with an endcapping agent selected from the group consisting of dialkyloxylates and tetraalkylureas in which the alkyl groups are lower alkyl radicals having from 1 to 5 carbons; in an amount ranging from 1 to 50 millimoles per minute for each 100 grams per minute of polyester feed at a temperature in the range of 270° C. to 320° C., thereby effecting endcapping of the carboxyl groups of the polyester to an acid content below 10 milliequivalents of $CO_2H$ per $10^6$gm of polyester.

2. The method according to claim 1 wherein the melt reaction of the polyester with the endcapping agent occurs for a period of time of at least 10 seconds.

3. The method of claim 1 wherein the carboxyl group containing polyester is polyethylene terephthalate.

4. The method of claim 1 wherein the endcapping agent is dimethyloxylate.

5. The method of claim 1 wherein the endcapping agent is bis(pentamethylene) urea.

6. A polyethylene terephthalate resin composition comprised of the reaction product of a carboxyl group containing polyethylene terephthalate resin having an acid content greater than 10 equivalents of $CO_2H$ per $10^6$ grams of polymer and a carboxyl group reactive endcapping agent selected from the group consisting of dialkyloxylates and tetraalkylureas in which the alkyl groups are lower alkyl radicals having 1 to 5 carbon atoms: to produce a polyethylene terephthalate resin having an acid number below 10 equivalents of $CO_2H$ per $10^6$ grams of polymer.

7. The polyethylene terephthalate resin composition of claim 6 wherein the endcapping agent is dimethyloxylate.

8. The polyethylene terephthalate resin composition of claim 6 wherein the endcapping agent is bis(pentamethylene) urea.

* * * * *